United States Patent [19]

Guest et al.

[11] Patent Number: 5,326,123
[45] Date of Patent: Jul. 5, 1994

[54] CONNECTOR ASSEMBLY

[75] Inventors: Vaughn W. Guest, Farmington; Paul T. Carter, Sandy, both of Utah

[73] Assignee: Eaton-Kenway Inc., Salt Lake City, Utah

[21] Appl. No.: 940,284

[22] Filed: Sep. 3, 1992

[51] Int. Cl.⁵ .............................................. B62D 53/12
[52] U.S. Cl. .................................. 280/434; 280/433; 280/479.1; 280/512
[58] Field of Search ............... 280/479.1, 425.1, 425.2, 280/432, 433, 442, 441.1, 441.2, 423.1, 427, 512, 514, 513, 496, 511, 434, 437

[56] References Cited

U.S. PATENT DOCUMENTS

| | | | |
|---|---|---|---|
| 2,410,373 | 10/1946 | Westervelt | 280/479.1 |
| 3,535,679 | 10/1970 | Connors | 280/434 |
| 4,063,749 | 12/1977 | Tracy et al. | 280/423.1 |
| 4,907,815 | 3/1990 | Hunger | 280/433 |
| 5,109,940 | 5/1992 | Yardley | 280/476 |
| 5,219,436 | 6/1993 | Abbott | 280/512 |

Primary Examiner—Margaret A. Focarino
Assistant Examiner—Ann Marie Boehler
Attorney, Agent, or Firm—Tarolli, Sundheim & Covell

[57] ABSTRACT

A connector assembly for interconnecting a vehicle and a trailer having a hitch element includes a gripper assembly which is operable to engage the hitch element. The gripper assembly includes a plurality of jaws which are pivotally connected with and are disposed in a circular array on a base. A rotatable ring circumscribes the circular array of jaws. A motor is connected with the ring and is operable to rotate the ring in a first direction to pivot the jaws toward each other. The motor is operable to rotate the ring in a second direction, which is opposite to the first direction, to pivot the jaws away from each other. The ring and jaws are interconnected by a plurality of links. The motor is connected with the ring by a drive chain. A hitch element detector detects when the hitch element is positioned in the gripper assembly. A ring position detector detects when the ring is in predetermined positions relative to the base.

15 Claims, 4 Drawing Sheets

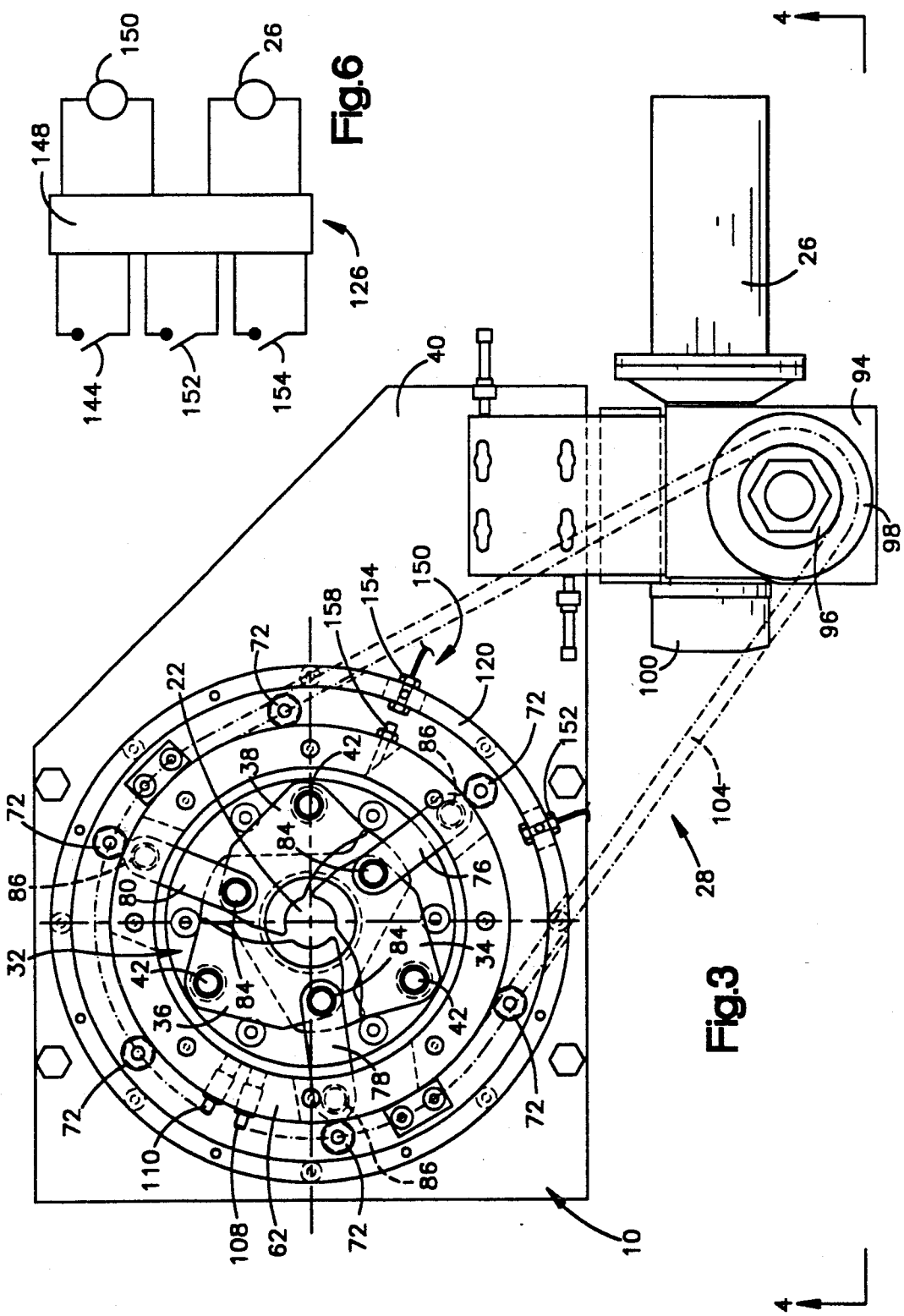

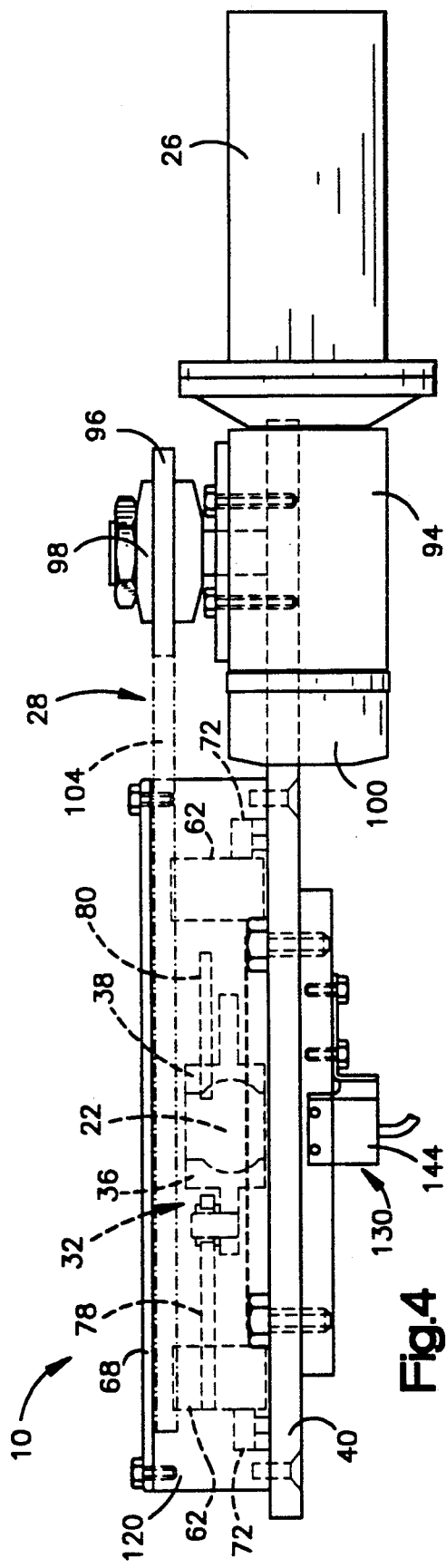

CONNECTOR ASSEMBLY

BACKGROUND OF THE INVENTION

The present invention relates to an apparatus for interconnecting a vehicle and a trailer.

A known apparatus for interconnecting a vehicle and a trailer is disclosed in U.S. Pat. No. 5,109,940 issued May 5, 1992 and entitled "Automated Guided Vehicle Top Disposed Towing Apparatus". The apparatus disclosed in this patent includes an automated guided vehicle having a lift assembly upon which a ball type hitch element is mounted. When the automated guided vehicle has moved the ball type hitch element into vertical alignment with a socket type hitch element connected with a trailer tow bar, the lift assembly moves the ball type hitch element upwardly into engagement with the socket type hitch element to interconnect the trailer and the vehicle.

SUMMARY OF THE INVENTION

The present invention provides a new and improved apparatus for use in interconnecting a vehicle and a trailer. The apparatus includes a gripper assembly which is operable to grip a hitch element. A motor is connected with the gripper assembly to operate the gripper assembly between open and closed conditions. If the hitch element is offset from a central axis of the gripper assembly during operation of the gripper assembly from the open condition to the closed condition, the gripper assembly will apply force against the hitch element and move the trailer relative to the vehicle and thereby move the hitch element and gripper assembly into alignment.

The gripper assembly advantageously includes a plurality of jaws which are disposed in a circular array on a base. A rotatable ring circumscribes the circular array of jaws. The ring is rotatable by the motor to pivot the jaws toward and away from each other.

In one embodiment of the invention, a plurality of links interconnect the jaws and the ring. A detector assembly is advantageously provided to detect when the hitch element and the gripper assembly have been properly positioned relative to each other. Another detector assembly is advantageously provided to detect the position of the ring.

BRIEF DESCRIPTION OF THE DRAWINGS

The foregoing and other features of the invention will become more apparent upon a consideration of the following description taken in connection with the accompanying drawings wherein:

FIG. 3 is a plan view, generally similar to FIG. 2, but on a reduced scale, illustrating the gripper assembly in a closed condition;

FIG. 4 is a side elevational view, taken generally along the line 4—4 of FIG. 3;

FIG. 5 is a fragmentary sectional view, taken generally along the line 5—5 of FIG. 2 with the gripper assembly in a closed condition and with the cover plate over the gripper assembly; and FIG. 6 is schematic illustration of control circuitry used with the connector apparatus and vehicle.

DESCRIPTION OF A PREFERRED EMBODIMENT

General Description

Figure 1:
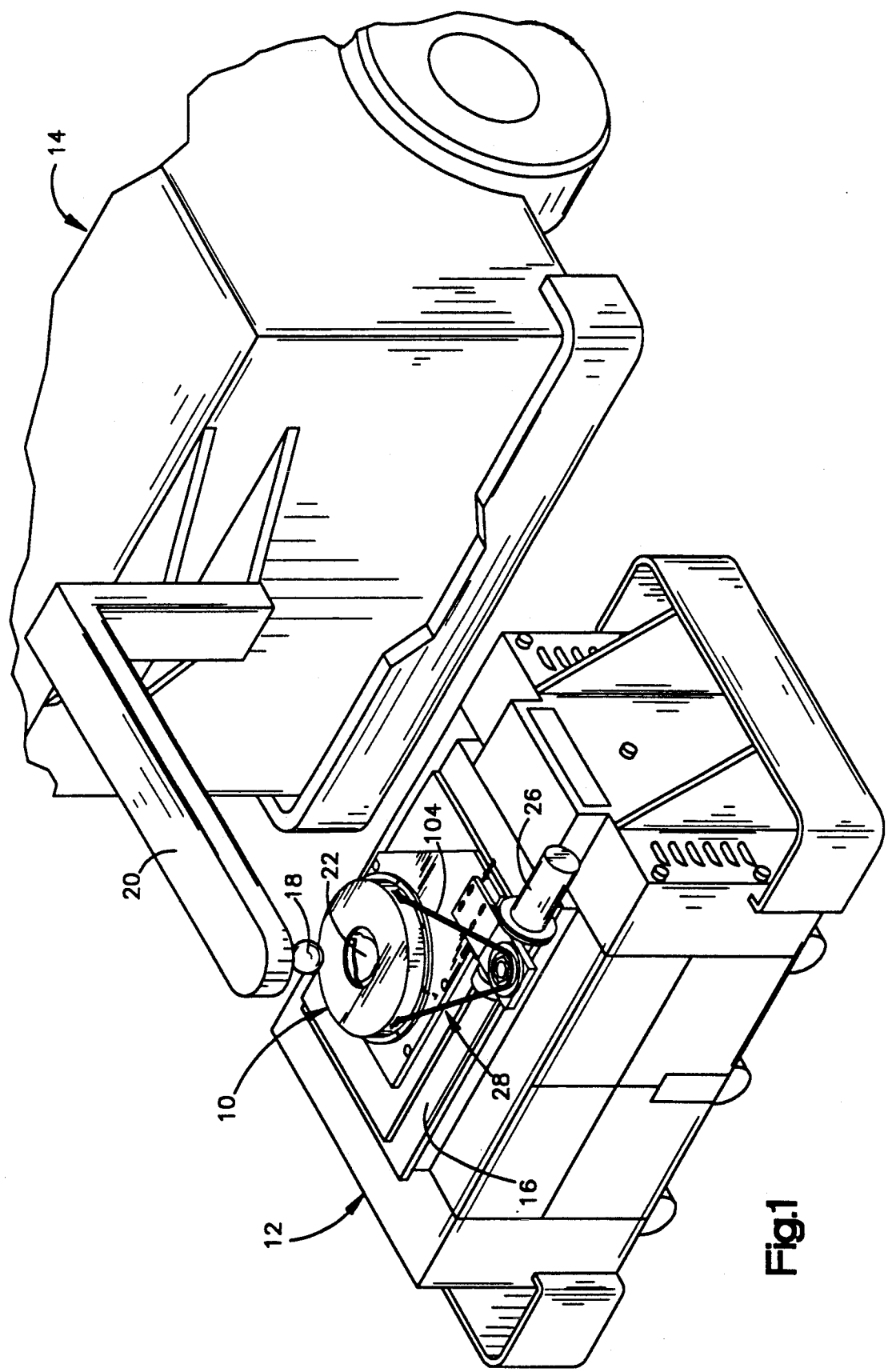
FIG. 1 is a pictorial view illustrating the relationship of a vehicle and trailer prior to interconnecting them with a connector apparatus constructed in accordance with the present invention.

An improved connector apparatus 10 (FIG. 1) is provided to interconnect an automated guided vehicle 12 and a trailer 14. The connector apparatus 10 is mounted on a vertically movable lift platform 16 on the vehicle 12. Suitable controls are provided in the vehicle 12 to cause the lift platform 16 to raise the connector apparatus 10. As the connector apparatus 10 is moved upwardly by the lift platform 16, the hitch element 18 on one end of a trailer tow bar 20 is received in an opening 22 in the connector apparatus 10.

When the hitch element 18 is disposed in the opening 22 in the connector apparatus 10, a reversible electric motor 26 operates a drive assembly 28. Operation of the motor 26 causes the drive assembly 28 to operate the connector apparatus 10 from an open condition shown in FIGS. 1 and 2 to a closed condition shown in FIG. 3. When the connector apparatus 10 is in the open condition, the opening 22 is relatively large to facilitate movement of the hitch element 18 into the opening. When the connector apparatus 10 is in the closed condition, the opening 22 is relatively small and the hitch element 18 is held against movement out of the opening.

It is contemplated that the position of the trailer hitch element 18 may be offset relative to the opening 22 in the connector apparatus 10. Since the opening 22 is relatively large when the connector apparatus 10 is in the open condition, raising the lift platform 16 with the trailer hitch element 18 offset from the central axis of the opening 22 can still result in the hitch element being received in the opening. Thus, if the position of the hitch element 18 relative to the connector apparatus 10 is offset by as much as one inch in any direction away from the vertical central axis of the opening 22, the hitch element 18 can still be received in the opening.

When the connector apparatus 10 is operated from the open condition to the closed condition with the hitch element 18 offset from the vertical central axis of the opening 22, the power transmitted from the motor 26 through the drive assembly 28 is effective to move the hitch element 18 into alignment with the connector apparatus 10. As this occurs, the trailer 14 is moved relative to the vehicle 12. In one specific embodiment of the invention, the motor 26 provided sufficient power to move a 13,000 pound fully loaded trailer 14 through a distance of one inch relative to the vehicle 12 in order to move the hitch element 18 into alignment with the connector apparatus 10. Once the connector apparatus 10 and hitch element 18 have interconnected, the vehicle 12 and trailer 14 can move through a full 360° relative to each other.

The general construction of the vehicle 12 and the trailer 14 is the same as disclosed in the aforementioned U.S. Pat. No. 5,109,940. It should be understood that although the connector apparatus 10 has been illustrated herein as being mounted on the vehicle 12 and the hitch element 18 mounted on the trailer 14, it is contemplated that the connector apparatus could be mounted on the trailer and the hitch element mounted on the vehicle. Although it is preferred to use a generally spherical ball type hitch element 18 in association with the connector apparatus 10, it should be understood that other known types of hitch elements could be used in association with the connector apparatus.

Gripper Assembly

Figure 2:
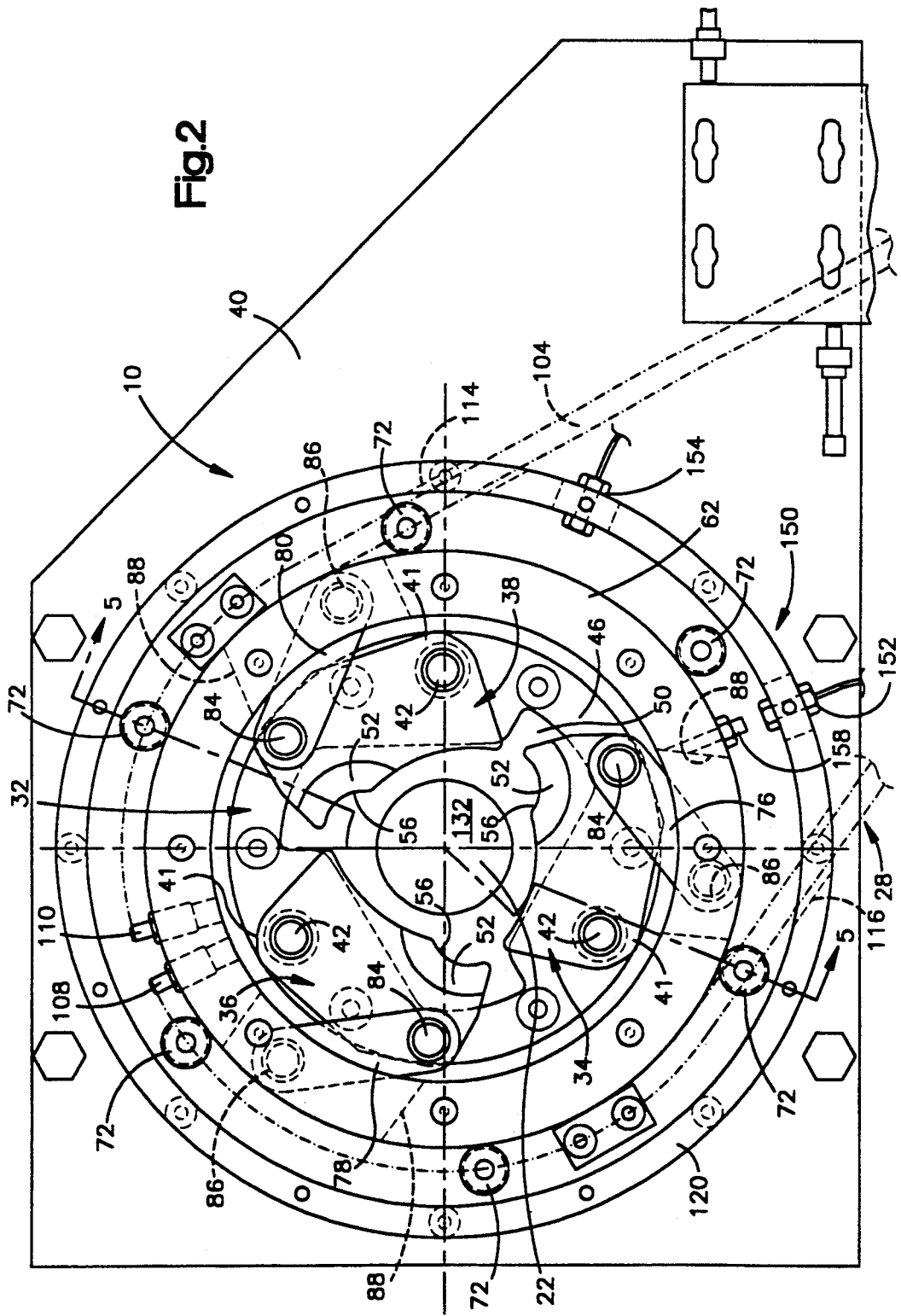
FIG. 2 is an enlarged plan view of the connector apparatus with a cover plate removed to expose components of a gripper assembly, the gripper assembly being shown in an open condition.

In addition to the motor 26 and drive assembly 28, the connector apparatus 10 includes a gripper assembly 32 which is operable between the open condition shogun in FIG. 2 and the closed condition shown in FIG. 3. The gripper assembly 32 includes a plurality of jaws 34, 36 and 38. The jaws 34–38 are disposed in an annular array about the vertical central axis of the opening 22 (FIG. 2) and are pivotal relative to a base plate 40.

Radially outer end portions 41 of the jaws 34–38 are pivotally mounted on pins 42 (FIGS. 2 and 5). The pivot pins 42 are fixedly secured to a jaw support plate 46 (FIG. 5) which is itself fixedly secured to the base plate 40. The jaw support plate 46 has a generally triangular central opening 50 into which hitch element engaging end portions 52 (FIGS. 2 and 5) on the jaws 34–38 extend.

The hitch element engaging end portions 52 (FIG. 5) of the jaws 34–38 have inwardly facing arcuate side surfaces 56 which form a portion of a sphere. The side surfaces 56 on the jaws 34–38 are sized to loosely grip the ball type hitch element 18. The clearance between the side surfaces 56 on the jaws 34–38 and the ball type hitch element 18 allows the hitch element and connector apparatus 10 to freely pivot relative to each through 360°. Thus, when the gripper assembly 32 is in the closed condition shown in FIG. 5, the side surfaces 56 on the jaws 34–38 form portions of a sphere having a diameter which is slightly greater than the diameter of the generally spherical ball type hitch element 18.

An annular ring 62 circumscribes the circular array of jaws 34–38. Annular upper and lower bearing plates 64 and 66 are secured to the ring 62 (FIG. 5). The lower bearing plate 66 slides along an upper side surface of the base plate 40. The upper bearing plate 64 slides along a lower side surface of a cover plate 68. It should be noted that the cover plate 68 has been omitted in FIGS. 2 and 3 to expose the components of the gripper assembly 32.

A plurality of roller bearings 72 (FIGS. 2 and 5) engage a cylindrical outer side surface of the ring 62. The roller bearings 72 guide sliding movement of the ring 62 relative to the base plate 40. The ring 62 is rotatable relative to the base plate 40 about a central axis of the gripper assembly 32 by the drive assembly 28.

A plurality of links 76, 78, and 80 (FIGS. 2 and 3) interconnect the jaws 34–38 and the ring 62. An inner end portion of each of the links 76 is connected with one of the jaws 34–38 by a pivot pin 84 (FIGS. 3 and 5). The outer end portions of the links 76–80 are pivotally connected to the ring 62 by pivot pins 86. An outer end portion of each of the links 76–80 extends through a slot 88 (FIGS. 2 and 5) in the ring 62 into engagement with a pivot pin 86. Opposite ends of each of the pivot pins 86 is fixedly secured with the ring 62 (FIG. 5).

Rotation of the ring 62 in a counterclockwise direction from the initial position shown in FIG. 2 to the actuated position shown in FIG. 3 operates the gripper assembly 32 from the open condition to the closed condition. As the gripper assembly 32 is operated from the open condition to the closed condition, the links 76–80 pivot the jaws 34–38 toward each other in a counterclockwise direction about the pivot pins 42.

As the ring 62 moves from the initial position shown in FIG. 2 to the actuated position shown in FIG. 3, the mechanical advantage provided by the interaction between the links 76–80 and the jaws 34–38 increases as the jaws approach the closed condition. This enables the inner side surfaces 56 (FIGS. 2 and 5) on the jaws 34–38 to apply force against the hitch element 18 to move the hitch element into alignment with the central axis of the gripper assembly 32 if the hitch element is initially offset relative to the central axis of the gripper assembly. Of course, as the hitch element 18 is moved relative to the gripper assembly 32 by closing of the jaws 34–38, the trailer 14 is moved relative to the vehicle 12.

Rotation of the ring 62 in a clockwise direction from the actuated position shown in FIG. 3 to the initial position shown in FIG. 2 operates the jaws 34–38 from the closed condition to the open condition to release the hitch element 18. Thus, as the ring 62 is moved in a clockwise direction from the actuated position shown in FIG. 3, the links 76–80 pivot the jaws 34–38 away from each other in a clockwise direction about their pivot pins 42. This moves the side surfaces 56 on the jaws 34–38 away from the hitch element 18 to release the hitch element.

Although it is preferred to use the links 76–80 to move the jaws 34–38, other drive elements could be used if desired. For example, cam tracks connected with the ring 62 could be used to move the jaws 34–38.

Drive Assembly

The drive assembly 28 (FIGS. 3 and 4) rotates the ring 62 to operate the connector apparatus 10 between open and closed conditions. The drive assembly 28 includes a speed reducer gear assembly 94 (FIG. 4) which is driven by the motor 26 and is connected with a drive sprocket 96 through a clutch assembly 98. A brake apparatus 100 stops rotation of the drive sprocket 96 whenever the motor 26 stops operation.

A drive chain 104 engages the drive sprocket 96. Opposite ends of the chain 104 are fixedly connected with the ring 62 by mounting pins 108 and 110 (FIG. 2). The drive chain 104 extends through openings 114 and 116 (FIG. 2) formed in a cylindrical housing side wall 120. The cylindrical housing wall 120 circumscribes and is coaxial with the ring 62.

Rotation of the drive sprocket 96 in a counterclockwise direction (as viewed in FIG. 3) pulls the chain 104 to rotate the ring 62 in a counterclockwise direction from the initial position of FIG. 2 to the actuated position of FIG. 3. Similarly, rotation of the drive sprocket 96 in a clockwise direction (as viewed in FIG. 3) pulls the chain 104 to rotate the ring 62 in a clockwise direction from the actuated position of FIG. 3 to the initial position of FIG. 2.

Although it is preferred to use the chain 104 to interconnect the motor 26 and ring 62, other drive arrangements could be utilized if desired. For example, a gear drive arrangement could be provided between the motor 26 and ring 62.

Controls

Control circuitry 126 (FIG. 6) detects when the connector apparatus 10 is in the open condition, when a hitch element 18 has been received in the opening 22 in the open connector apparatus, and when the connector apparatus has been operated from the open condition to the closed condition. A hitch element detector assembly 130 (FIG. 4) is connected with the control circuitry 126. The hitch element detector assembly 130 detects the presence of the hitch element 18 in the central opening 22 in the gripper assembly 32. The hitch element detector assembly 130 includes a circular actuator plate 132 (FIG. 5) which is slidably mounted on three guide members equally spaced and shown as 134 and 136. The actuator plate 132 is biased upwardly by three springs equally spaced and shown as 138 and 140.

As the connector apparatus 10 is raised by the lift platform 16, the hitch element 18 moves into the opening 22. The lower end portion of the hitch element 18 engages the actuator plate 132 and moves the actuator plate downwardly against the influence of the biasing springs 138 and 140. This downward movement of the actuator plate 132 actuates a detector switch 144 (FIGS. 4 and 6). Upon operation of the normally open detector switch 144 to its closed condition by the actuator plate 132, a motor controller 148 (FIG. 6) de-energizes a lift motor 150 to stop upward movement of the lift platform 16.

A ring position detector assembly 150 (FIG. 3) detects the position of the ring 62 relative to the base plate 40. Thus, the ring detector assembly 150 detects when the ring 62 is in the initial position of FIG. 2 and the actuated position of FIG. 3. The ring detector assembly 150 includes a pair of normally open, magnetically actuatable reed switches 152 and 154 (FIGS. 2, 3 and 6).

The reed switches 152 and 154 are operated from their normally open conditions to closed conditions by a magnet 158 (FIGS. 2 and 3) mounted on the ring 62. Thus, when the ring 62 is in the initial position of FIG. 2, the magnet 158 is adjacent to a reed switch 152 and is effective to hold the reed switch 152 in the closed condition. Similarly, when the ring 62 is in the actuated position of FIG. 3, the magnet 158 is adjacent to the reed switch 154 and is effective to hold the reed switch in its closed condition.

During operation of the motor 26 to move the ring 62 from the initial position of FIG. 2 to the actuated position of FIG. 3, the reed switch 154 is in its open condition. As soon as the ring 62 reaches the actuated position of FIG. 3, the magnet 158 closes the reed switch 154. In response to this input signal, the motor controller 148 (FIG. 6) de-energizes the motor 26. At this time, the brake apparatus 100 (FIG. 3) immediately stops rotation of the drive sprocket 96 and the ring 62.

Similarly, during operation of the drive motor 26 to rotate the ring 62 from the actuated position of FIG. 3 to the initial position of FIG. 2, the reed switch 152 is in an open condition. When the ring 62 reaches the initial position of FIG. 2, the magnet 158 operates the reed switch 152 from its open condition to its closed condition. In response to this input signal, the motor controller 148 interrupts operation of the electric motor 26. The brake apparatus 100 is effective to stop rotation of the drive sprocket 96 and the ring 62.

It should be understood that the hitch element detector assembly 130 and ring position detector assembly 150 could be used together, as described herein, or separately. It should also be understood the hitch element detector assembly 130 and the ring position detector assembly could have a construction which is different from the illustrated construction.

Conclusion

The present invention provides a new and improved apparatus 10 for use in interconnecting a vehicle 12 and a trailer 14. The apparatus 10 includes a gripper assembly 32 which is operable to grip a hitch element 18. A motor 26 is connected with the gripper assembly 32 to operate the gripper assembly between open and closed conditions. If the hitch element 18 is offset from a central axis of the gripper assembly 32 during operation of the gripper assembly from the open condition (FIG. 2) to the closed condition (FIG. 3), the gripper assembly 32 will apply force against the hitch element 18 and move the trailer 14 relative to the vehicle 12 and thereby move the hitch element and gripper assembly into alignment.

The gripper assembly 32 advantageously includes a plurality of jaws 34–38 which are disposed in a circular array on a base 40. A rotatable ring 62 circumscribes the circular array of jaws 34–38. The ring 62 is rotatable by the motor 26 to pivot the jaws 34–38 toward and away from each other.

In one embodiment of the invention, a plurality of links 76–80 interconnect the jaws 34–38 and the ring 62. A detector assembly 130 is advantageously provided to detect when the hitch element 18 and the gripper assembly 32 have been properly positioned relative to each other. Another detector assembly 150 is advantageously provided to detect the position of the ring 62.

Having described the invention, the following is claimed:

1. An apparatus for use in interconnecting a vehicle and a trailer, said apparatus comprising gripper means for engaging a hitch element, said gripper means being operable between an open condition and a closed condition, said gripper means and hitch element being relatively movable to a position in which said gripper means at least partially encloses the hitch element when said gripper means is in the open condition, said gripper means being disposed in gripping engagement with the hitch element when said gripper means is in the closed condition to interconnect the vehicle and trailer, said gripper means includes an annular array of jaws having a central opening of a first size when said gripper means is in the open condition and a second size which is smaller than the first size when said gripper means is in the closed condition, motor means connected with said gripper means for operating said gripper means between the open and closed condition, drive means for interconnecting said annular array of jaws and said motor means to enable operation of said motor means to effect relative movement between said jaws, and detector means for detecting when the hitch element is disposed in the opening formed by said annular array of jaws.

2. An apparatus as set forth in claim 1 wherein said gripper means includes surface means for applying force against the hitch element to move the trailer relative to the vehicle under the influence of force transmitted from said motor means to said gripper means during operation of said gripper means from the open condition to the closed condition.

3. An apparatus for use in interconnecting a vehicle and a trailer, said apparatus comprising gripper means for engaging a hitch element, said gripper means being operable between an open condition and a closed condition, said gripper means and hitch element being relatively movable to a position in which said gripper means at least partially encloses the hitch element when said gripper means is in the open condition, said gripper means being disposed in gripping engagement with the hitch element when said gripper means is in the closed condition to interconnect the vehicle and trailer, said gripper means includes a base, a plurality of jaws pivotally connected with said base and disposed in a generally circular array on said base, and a rotatable ring circumscribing said circular array of jaws, and motor means connected with said gripper means for operating said gripper means between the open and closed condition, said motor means being connected with said ring and being operable to rotate said ring in a first direction to pivot said jaws toward each other and operate said gripper means from the open condition to the closed condition, said motor means being operable to rotate said ring in a second direction to pivot said jaws away from each other and operate said gripper means from the closed condition to the open condition.

4. An apparatus as set forth in claim 3 wherein said jaws have surfaces which at least partially form an opening, and detector means for detecting when the hitch element is disposed in the opening formed by said surface means.

5. An apparatus as set forth in claim 3 further including a plurality of links interconnecting said jaws and said ring, each of said links having a first end portion pivotally connected to one of said jaws and a second end portion pivotally connected to said ring.

6. An apparatus as set forth in claim 3 further including drive means interconnecting said motor means and said ring, said drive means including a drive sprocket connected with said ring and a chain extending between said ring and drive sprocket for transmitting force from said drive sprocket to said ring to rotate said ring relative to said base.

7. An apparatus as set forth in claim 3 wherein said ring is in a first position relative to said base when said gripper means is in the closed condition and is in a second position relative to said base when said gripper means is in the open condition, said apparatus further including detector means for detecting when said ring moves to the first position relative to said base during rotation of said ring in the first direction and for detecting when said ring moves to the second position relative to said base during rotation of said ring in the second direction, and means for interrupting operation of said motor means in response to said detector means detecting that said ring has moved to the first position during rotation of said ring in the first direction and for interrupting operation of said motor means in response to said detector means detecting that said ring has moved to the second position during rotation of said ring in the second direction.

8. An apparatus for use in interconnecting a vehicle and a trailer having a hitch element, said apparatus comprising a base connected with the vehicle, a plurality of jaws connected with said base and at least partially defining an opening, said plurality of jaws being movable relative to said base between an open condition in which the opening is relatively large and a closed condition in which the opening is relatively small to enable said jaws to engage the hitch element and interconnect the vehicle and trailer when said jaws are in the closed condition, first detector means for detecting when the hitch element is disposed in the opening when said jaws are in the open condition, motor means connected with said jaws for moving said jaws between the open and closed condition, second detector means for detecting when said jaws move to the closed condition during operation of said motor means to move said jaws to the closed condition and for detecting when said jaws move to the open condition during operation of said motor means to move said jaws to the open condition, and control means for initiating operation of said motor means to move said jaws from the open condition toward the closed condition in response to said first detector means detecting that the hitch element is in the opening when said jaws are in the open condition, said control means being effective to interrupt operation of said motor means in response to said second detector means detecting movement of said jaws to the closed condition during movement of said jaws toward the closed condition with the hitch element in the opening, said control means being effective to initiate operation of said motor means to move said jaws from the closed condition to the open condition with the hitch element in the opening, said control means being effective to interrupt operation of said motor means in response to said second detector means detecting movement of said jaws to the open condition during movement of said jaws toward the open condition.

9. An apparatus as set forth in claim 8 wherein said jaws have surface means for applying force against the hitch element to move the trailer relative to the vehicle under the influence of force transmitted from said motor means to said jaws during movement of said jaws from the open condition to the closed condition.

10. An apparatus as set forth in claim 8 wherein said jaws are pivotally connected with said base and are disposed in a generally circular array on said base, said apparatus further including a rotatable circular member connected with said circular array of jaws, said motor means being connected with said circular member and being operable to rotate said circular member in a first direction to pivot said jaws toward each other and move said jaws from the open condition to the closed condition, said motor means being operable to rotate said circular member in a second direction to pivot said jaws away from each other and move said jaws from the closed condition to the open condition.

11. An apparatus as set forth in claim 10 further including a plurality of links interconnecting said jaws and said circular member, each of said links having a first end portion pivotally connected to one of said jaws and a second end portion pivotally connected to said circular member.

12. An apparatus for use in interconnecting a vehicle and a trailer, said apparatus comprising gripper means for engaging a hitch element, said gripper means being operable between an open condition and a closed condition, said gripper means and hitch element being relatively movable to a position in which said gripper means at least partially encloses the hitch element when said gripper means is in the open condition, said gripper means being disposed in gripping engagement with the hitch element when said gripper means is in the closed condition to interconnect the vehicle and trailer, said gripper means includes an annular array of jaws having a central opening of a first size when said gripper means is in the open condition and a second size which is smaller than the first size when said gripper means is in the closed condition, motor means connected with said gripper means for operating said gripper means between the open and closed condition, drive means for interconnecting said annular array of jaws and said motor means to enable operation of said motor means to effect relative movement between said jaws, detector means for detecting when said gripper means is in the open condition and when said gripper means is in the closed condition, and control means for interrupting operation of said motor means in response to said detector means detecting that said gripper means has been operated to the closed condition during operation of said gripper means from the open condition to the closed condition, said control means being operable to interrupt operation of said motor means in response to said detector means detecting that said gripper means has been operated to the open condition during operation of said gripper means from the closed condition to the open condition.

13. An apparatus for use in interconnecting a vehicle and a trailer, said apparatus comprising gripper means for engaging a hitch element, said gripper means being operable between an open condition and a closed condition, said gripper means and hitch element being relatively movable to a position in which said gripper means at least partially encloses the hitch element when said gripper means is in the open condition, said gripper means being disposed in gripping engagement with the hitch element when said gripper means is in the closed condition to interconnect the vehicle and trailer, said gripper means includes an annular array of jaws having a central opening of a first size when said gripper means is in the open condition and a second size which is smaller than the first size when said gripper means is in the closed condition, motor means connected with said gripper means for operating said gripper means between the open and closed condition, drive means for interconnecting said annular array of jaws and said motor means to enable operation of said motor means to effect relative movement between said jaws, said drive means includes a rotatable member connected with said jaws, said motor means being operable to rotate said rotatable member in a first direction relative to said base to move said jaws toward each other and operate said gripper means from the open condition to the closed condition, said motor means being operable to rotate said rotatable member in a second direction relative to said base to move said jaws away from each other and operate said gripper means from the closed condition to the open condition, said drive means further includes a plurality of links interconnecting said jaws and said rotatable member, each of said links having a first end portion pivotally connected to one of said jaws and a second end portion pivotally connected to said rotatable member.

14. An apparatus as set forth in claim 13 wherein said drive means further includes a drive sprocket connected with said motor means and a chain connected with said drive sprocket and said rotatable member, said chain being operable to transmit force provided by said motor means to rotate said rotatable member relative to said base.

15. An apparatus for use in interconnecting a vehicle and a trailer, said apparatus comprising gripper means for engaging a hitch element, said gripper means being operable between an open condition and a closed condition, said gripper means and hitch element being relatively movable to a position in which said gripper means at least partially encloses the hitch element when said gripper means is in the open condition, said gripper means being disposed in gripping engagement with the hitch element when said gripper means is in the closed condition to interconnect the vehicle and trailer, said gripper means includes a base, a plurality of jaws connected with said base and disposed in a generally circular array on said base, a rotatable ring circumscribing said circular array of jaws, and a plurality of links interconnecting said jaws and said rotatable ring, each of said links having a first end portion pivotally connected to one of said jaws and a second end portion pivotally connected to said ring, said ring being rotatable in a first direction to pivot said links and move said jaws toward each other and operate said gripper means from the open condition to the closed condition, said ring being rotatable in a second direction to pivot said links and move said jaws away from each other and operate said gripper means from the closed condition to the open condition.

* * * * *